UNITED STATES PATENT OFFICE.

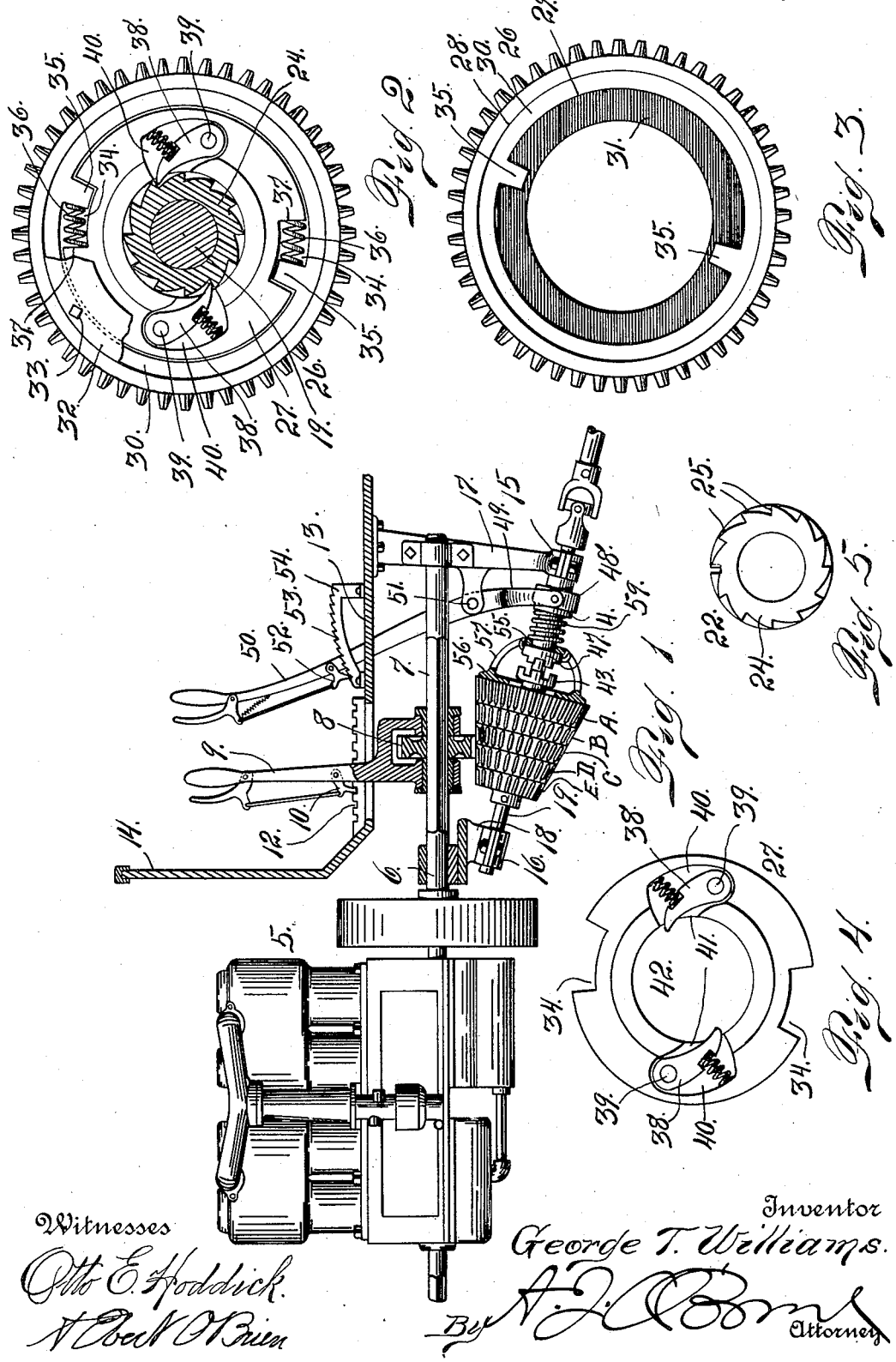

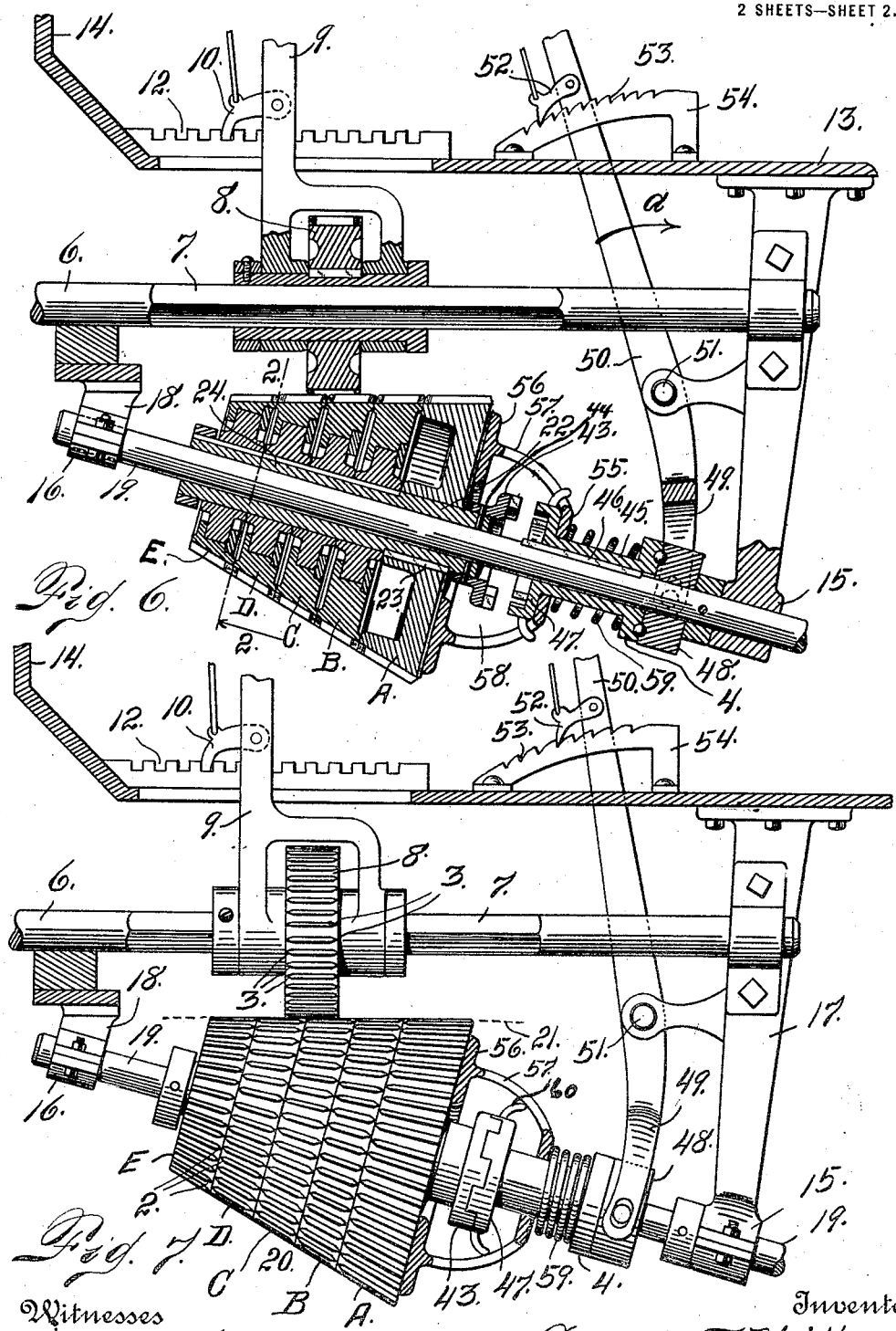

GEORGE T. WILLIAMS, OF DENVER, COLORADO.

POWER-TRANSMISSION MECHANISM.

1,150,087.  Specification of Letters Patent.  Patented Aug. 17, 1915.

Application filed September 16, 1913. Serial No. 789,978.

*To all whom it may concern:*

Be it known that I, GEORGE T. WILLIAMS, a citizen of the United States, residing at the city and county of Denver and State of Colorado, have invented certain new and useful Improvements in Power-Transmission Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in power transmission mechanism, my object being to provide a construction of this class which shall efficiently perform the function of transmitting power from a prime motor as an internal combustion engine, to the machine or mechanism to be operated thereby, as an automobile. While my improved construction is adapted for general use, whenever it is necessary to transmit power in an efficient manner, the construction will be described more especially with reference to its use in transmitting power from the operating shaft of an explosive engine to the rear axle, for instance, of an automobile.

Another object of the construction is to provide mechanism of this character, whereby the speed of the driven shaft may be regulated at will without the concussion or jar usually incident to such operations. By virtue of my improved construction, the speed of the machine may be changed from low to high or from high to low, with such ease so far as the operation of the mechanism is concerned, and so gradually as to relieve the occupants of the machine from the disagreeable sensation ordinarily experienced when producing speed changes during the operation of an automobile.

My improved construction includes a sectional cone shaped gear, each section of the gear being independently operable and the gear being so arranged that the line of contact between it and the gear on the engine shaft, when the last named gear is thrown into mesh with any of the sections of the cone shaped gear, is parallel with the axis of the engine shaft. Each section of the cone shaped gear except that of greatest diameter is connected with the driven shaft by means of a ratchet sleeve and a pawl carrying collar, the pawls of the collar being adapted to actuate the ratchet sleeve, when the gear is traveling in one direction, while when the gear is traveling in the opposite direction, the pawls slip over the ratchet teeth without imparting motion to the sleeve in accordance with the well known form of ratchet and pawl mechanism of this character. The gear section or rim is interlocked with the pawl carrying collar by means of teeth which project into recesses formed in the collar, the recesses being larger than the teeth, and spiral springs being interposed between the teeth and one end wall of each recess in order to permit a limited movement of the gear section in one direction independently of the pawl carrying collar, during the operation of changing the speed of the machine by shifting the driving gear from its intermeshing relation with one section of the cone shaped gear, into mesh with another section. The gear section may move in the opposite direction for the same purpose by virtue of the fact that the pawls will slip over the teeth of the ratchet when the pawl carrying collar is moving in one direction as heretofore explained. While this ratchet sleeve is normally loose on the driven shaft, when it is desired to operate the shaft through the medium of the cone shaped gear, the ratchet sleeve, which is provided with a clutch member at one extremity, is interlocked with another sleeve carrying a clutch member, the last named sleeve being splined upon the driven shaft, whereby when the clutch members are in the interlocking relation, the driven shaft is rotated, at a speed depending upon the rotation of the driving shaft and the section of the cone gear with which the gear carried by the driving shaft meshes.

Other novel features of the construction will be apparent as this specification proceeds.

Referring to the accompanying drawing, Figure 1 is a side elevation partly in section, illustrating my improved power transmission mechanism, shown in connection with an explosive engine and the shaft thereof. Fig. 2 is a section taken through the cone shaped gear on the line 2—2, Fig. 6, looking toward the left, the parts being shown on a larger scale. Fig. 3 is a detail view of the gear section independently of the pawl carrying collar which when the parts are assembled is employed in connection therewith. Fig. 4 is a similar view of the pawl carrying collar. Fig. 5 is an end elevation of the ratchet sleeve with which the pawls of the said collar interlock for driving purposes. Fig. 6 is a sectional view of the transmission mechanism shown in connection with the gear on the engine shaft, the parts being shown on a larger scale than in Fig. 1, but on a smaller scale than Figs. 2 to 5 inclusive. Fig. 7 is an elevation of the construction shown in Fig. 6, taken on a similar scale.

The same reference characters indicate the same parts in all the views.

Let the numeral 5 designate a prime motor, as an explosive engine whose shaft 6 is formed polygonal, preferably square, in cross section as shown at 7 to receive an operating gear 8, the opening of which is of counterpart shape whereby the gear is longitudinally slidable on the part 7 of the shaft. An operating lever 9 is interlocked with the gear for shifting purposes, the lever having a dog 10 adapted to engage a toothed plate 12 mounted on a stationary part 13 of the machine. It may be stated that this part 13 may be considered the bed or bottom of the automobile body, the part 14 which is continuous therewith being the dash-board in the rear of the engine.

Mounted upon a stationary part of the machine by means of journal boxes 15 and 16, supported by hangers 17 and 18, is a driven shaft 19 upon which is mounted a conical shaped gear 20 so arranged that the line 21 of contact between the gear 20 and the operating gear 8 shall be parallel with the axis of the driving shaft 6. This gear 20 is composed of a plurality of sections designated A, B, C, D and E respectively, the said sections being mentioned in the order of their size beginning with the largest section. The section A is splined upon a sleeve 22 as shown at 23. The portion 24 of this sleeve beyond the gear section A is provided with ratchet teeth 25, the said sleeve being normally loose on the shaft but adapted to be interlocked therewith for power transmission purposes. Each of the gear sections B, C, D and E is composed of two parts, namely, a rim 26 and a pawl carrying collar 27. This rim is the toothed or cogged portion of the gear and is provided with circumferential cavities 28 and 29 the latter being adapted to receive the collar 27 when the parts are assembled as shown in Fig. 2. The cavity 29 is deeper than the cavity 28, the numeral 30 indicating the bottom of the cavity 28 and the numeral 31 the bottom of the cavity 29 when looking at the gear member as illustrated in Fig. 3. The collar 27 engages the bottom 31 of the cavity 29 and is secured in place by means of a fastening plate 32 which engages the bottom 30 of the cavity 28, the said plate being secured in place by means of suitable fastening devices 33. The rim or outer circumferential portion of the collar 27 is provided with recesses 34 adapted to receive teeth 35 with which the rim 26 is provided. The recesses 34 are larger than the teeth 35 and spiral springs 36 are located between the teeth and the walls 37 at one end of each recess, whereby the rim of the gear may have a limited movement against the springs 36 in one direction for a purpose hereinafter more fully described.

The collar 27 carries a plurality of pawls 38 pivoted at 39 and occupying recesses 40 formed in the body of the collar and having openings 41 to allow the extremities of the pawls to protrude into the opening 42, which is occupied by the ratchet sleeve when the parts are assembled. In other words, when the mechanism is connected in assembled relation as illustrated in Fig. 2, the pawls 38 engage the teeth 25 of the sleeve, whereby as the gear turns in one direction, the sleeve will be actuated by virtue of the interlocking connection afforded by the pawl carrying collar while when the gear section is moved in the opposite direction, the pawls will slip over the teeth, whereby the gear sections move idly with reference to the driven shaft.

As illustrated in the drawing, the gear section A is directly secured to the ratchet sleeve as heretofore explained, whereby the driven shaft 19 will be actuated by the movement of the gear section A in either direction. It is assumed that when this mechanim is employed for power transmission in connection with automobiles, that the gear section A will always be engaged by the operating gear 8 when it is desired to reverse the travel of the machine. In other words, before reversing, the gear 8 will be thrown into the low speed section A of the cone shaped gear.

Secured to one extremity of the sleeve 22, being the extremity adjacent the gear section A, is a clutch member 43 whose interlocking face is directed outwardly or away from the gear, this clutch member being secured to the sleeve by means of a pin 44 which passes through the collar of the clutch member and the sleeve. Slidably mounted on the shaft 19 beyond the clutch member 43, is a sleeve 45, said sleeve being splined on the shaft as shown at 46, whereby it is freely movable longitudinally of the shaft and rotates therewith. At one extremity, namely, that in the direction of the clutch member 43, the sleeve 45 is provided with a clutch member 47 arranged to coöperate with the clutch member 43 when the sleeve 45 is properly shifted for automobile driving purposes. At the opposite extremity of the sleeve 45 the latter is provided with a collar 4 which is normally in engagement with a collar 48 upon which is trunnioned the lower bifurcated extremity 49 of a manually operable lever 50 which is fulcrumed on a stationary part of the machine as shown at 51, the said lever being located in the desired position of adjustment by means of a pawl 52 which engages the toothed face 53 of a suitable quadrant 54.

Mounted upon the sleeve 45 just in the rear of the clutch member 47, which forms a shoulder, is the collar portion 55 of a friction face 56 which is connected with the collar by spider arms 57, the said arms curving outwardly from the collar 55, leaving a space 58 between the friction face and the collar of the friction device, to permit the locking and releasing action of the clutch member 47.

Located between the collar 55 of the friction device and the rear collar 4 of the sleeve 45 is a spiral spring 59 which when the lever 50 is in the position corresponding with the inactive condition of the shaft 19, simply holds the collar 55 of the friction device in engagement with the rear shoulder of the clutch member 47. When it is desired to actuate the shaft and connect it with the rear axle for instance, (not shown) of the automobile for operating purposes, the chauffeur will operate the hand lever 50 by moving the upper arm thereof in the direction indicated by the arrow $a$ see Fig. 6, whereby the lower bifurcated arm, together with the collar 48, the sleeve 45 and its clutch member 47, will be moved toward the coöperating clutch member 43. During this operation, the spring 59 will first be compressed and act upon the collar 55 of the friction device and force the face 56 of the latter into operative engagement with the gear section A, whereby the friction device will be rotating as fast as the gear section A by the time the clutch members 43 and 47 are brought into interlocking engagement, thus preventing any jerking action when starting the machine and preventing any sudden change of speed due to the interlocking of the coöperating clutch members.

It will be observed that the sleeve 45 and the friction device are independently movable toward the clutch member 43. Since when the lever 50 is actuated as indicated by the arrow $a$ the sleeve 45 together with the clutch member 47 will be positively moved toward the member 43, while the friction face 56 of the friction device will be forced against the adjacent face of the gear section A by virtue of the compression of the spiral spring 59. The friction face 56 of the friction device is normally, or when the shaft 19 is not in motion, slightly separated from the gear section A. As soon however, as the lever 50 begins its movement to cause the clutch member 47 to approach its coöperating member, the compression of the spring 59 will drive the friction face 56 against the gear section A and cause the shaft 59 to begin its rotary movement before the two clutch members are in interlocking relation. The clutch member 47 may be provided with fingers 60 which project between the spider arms 57 of the friction device until the clutch members are in engagement, whereby the rotary action of the clutch member due to the engagement of the friction face of the gear section A will positively impart a corresponding rotary movement to the shaft 19. This result would also follow by virtue of the friction between the collar 55 of the friction device and the rear shoulder of the clutch member 47.

In order to facilitate the operation of changing the speed of the shaft 19 and consequently of the automobile to be operated thereby and cause the cogs of the operating gear 8 to slip readily from their intermeshing relation with one gear section into the corresponding relation with another gear section, the cogs of the gear 8 and those of the gear sections A, B, C, etc., have their extremities pointed as shown at 2 and 3. Hence as the gear 8 is shifted from its meshing relation with one section of the cone gear into another section, the cogs of the two gears by virtue of their beveled extremities will slip readily past each other, and by virtue of the fact that the rim members 26 of the gear sections B, C, D and E, may yield in one direction against the springs 36 and in the opposite direction by virtue of the slipping of the pawls 38 over the teeth of the ratchet sleeve; these gear sections have sufficient yielding capacity to overcome any difficulty in moving the operating gear from its meshing relation with one section into a corresponding relation with another section of the cone gear.

It is preferred that the width of the cogged periphery of the gear 8 shall be somewhat wider than the periphery of either of the gear sections B, C, D and E in order that it shall always be in mesh with two of the sections. It will be understood, however, that the section of less diameter will control the speed of the shaft 19, since the smaller gear section will rotate somewhat faster than the adjacent larger section. The gear section A however, is preferably of somewhat greater width than the gear 8 so that the section A alone may control the speed of the shaft 19, since when the operating gear 8 is in mesh with the section A, the shaft 19 is operating at its lowest possible speed.

From the foregoing description the use and operation of my improved construction will be readily understood. The person in charge of the machine will naturally start the machine with the operating gear 8 in mesh with the largest section A of the cone shaped gear. Then as he desires to increase the speed of the machine for a given rotary movement of the operating gear, he will shift the latter forwardly and cause it to mesh with a smaller gear, thus increasing the rotary action of the shaft 9 for a given rotation of the engine shaft 6.

It will be understood that when the engine is started or cranked, the clutch members 43 and 47 will be separated and the lever 50 in the position shown in Fig. 6. If it be assumed that the operating gear 8 is in mesh with the section A of the cone gear when the engine is started, the person in charge of the automobile for instance, will shift the lever 50 from the position shown in Fig. 6 to the position shown in Fig. 7, whereby the shaft 19 will be interlocked with the ratchet sleeve 22 and consequently operated by the section A of the cone shaped gear. In this case, the automobile will start at the lowest possible speed. Then as the operator desires to increase the speed of the machine, he shifts the gear 8 on its shaft 6 by means of the lever 9 as heretofore explained.

Having thus described my invention, what I claim is:

1. Transmission mechanism including a cone shaped gear composed of independently operable sections, a straight gear movable to successively mesh with said sections, a sleeve upon which the cone shaped gear is mounted, one section of the gear being fast on the sleeve to move therewith in either direction, while the other sections are each composed of an outer rim and an inner collar having an interlocking connection with the rim to permit a limited independent rotary movement in one direction, pawls carried by said collar and the sleeve having ratchet teeth which said pawls are adapted to engage to rotate the sleeve in one direction, while the pawls slip idly over the ratchet teeth in the opposite direction, being the direction opposite the first named movement of the gear rim independently of the collar.

2. Transmission mechanism including a cone shaped gear composed of independently operable sections, a straight gear movable to successively mesh with said sections, a sleeve upon which the cone shaped gear is mounted, one section of the gear being fast on the sleeve to move therewith in either direction, while the other sections are each composed of an outer rim and an inner collar having an interlocking connection with the rim to permit a limited independent rotary movement in one direction, pawls carried by said collar and the sleeve having ratchet teeth which said pawls are adapted to engage to rotate the sleeve in one direction, while the pawls slip idly over the ratchet teeth in the opposite direction, being the direction opposite the first named movement of the gear rim independently of the collar, a shaft upon which the sleeve is loosely mounted and adjustable means for interlocking the sleeve with the shaft for power transmission purposes.

3. Transmission mechanism including a cone shaped gear composed of independently operable sections, a straight gear movable to successively mesh with said sections, a sleeve upon which the cone shaped gear is mounted, one section of the gear being fast on the sleeve to move therewith in either direction, while the other sections are each composed of an outer rim and an inner collar having an interlocking connection with the rim to permit a limited independent rotary movement in one direction, pawls carried by said collar and the sleeve having ratchet teeth which said pawls are adapted to engage to rotate the sleeve in one direction, while the pawls slip idly over the ratchet teeth in the opposite direction, being the direction opposite the first named movement of the gear rim independently of the collar, a shaft upon which the sleeve is loosely mounted, adjustable means for interlocking the sleeve with the shaft for power transmission purposes, the said means including a clutch member fast on the ratchet sleeve and a second clutch member splined on the shaft and adjustable to interlock with the corresponding member of the ratchet sleeve.

4. Transmission mechanism including a cone shaped gear composed of independently operable sections, a straight gear movable to successively mesh with said sections, a sleeve upon which the cone shaped gear is mounted, one section of the gear being fast on the sleeve to move therewith in either direction, while the other sections are each composed of an outer rim and an inner collar having an interlocking connection with the rim to permit a limited independent rotary movement in one direction, pawls carried by said collar and the sleeve having ratchet teeth which said pawls are adapted to engage to rotate the sleeve in one direction, while the pawls slip idly over the ratchet teeth in the opposite direction, being the direction opposite the first named movement of the gear rim independently of the collar, a shaft upon which the sleeve is loosely mounted, adjustable means for interlocking the sleeve with the shaft for power transmission purposes, the said means including a clutch member fast on the ratchet sleeve, a second clutch member splined on the shaft and adjustable to interlock with the corresponding member of the ratchet sleeve, and a friction device carrried by the splined clutch member, and adjustable with the latter to engage the adjacent face of a gear section in advance of the interlocking of the clutch members.

5. Transmission mechanism including a cone shaped gear composed of independently operable sections, a straight gear movable to successively mesh with said sections, a sleeve upon which the cone shaped gear is mounted, one section of the gear being fast on the sleeve to move therewith in either direction, while the other sections are each composed of an outer rim and an inner collar having an interlocking connection with the rim to permit a limited independent rotary movement in one direction, pawls carried by said collar and the sleeve having ratchet teeth which said pawls are adapted to engage to rotate the sleeve in one direction, while the pawls slip idly over the ratchet teeth in the opposite direction, being the direction opposite the first named movement of the gear rim independently of the collar, a shaft upon which the sleeve is loosely mounted, adjustable means for interlocking the sleeve with the shaft for power transmission purposes, the said means including a clutch member fast on the ratchet sleeve, a second clutch member splined on the shaft and adjustable to interlock with the corresponding member of the ratchet sleeve, and a friction device carried by the splined clutch member and adjustable with the latter to engage the adjacent face of a gear section in advance of the interlocking of the clutch members, the friction device being interlocked rotatably with the splined sleeve until the clutch members engage.

6. Transmission mechanism including a driving shaft, a straight gear mounted thereon to rotate therewith but slidable longitudinally thereof, a driven shaft having its axis inclined to that of the driving shaft, a cone shaped gear mounted on the driven shaft and composed of independently operable sections which the straight gear is adapted to engage during its longitudinal movement, a sleeve with which one section of the cone gear is made fast to travel therewith in both directions, the other sections of the cone gear having a ratchet and pawl connection with the sleeve to compel the sleeve to travel therewith in one direction, the rims of the said gear sections having a limited movement independently of the sleeve in the same direction.

7. The combination of a shaft, a sleeve mounted thereon, a cone shaped gear composed of a number of sections, one section being fast on the sleeve and the other sections being composed of rim members, and collars, the rim members having teeth and the collars having recesses which the teeth engage, each recess being larger than the entering tooth, a spring located between each tooth and the wall at one extremity of its recess to permit a limited independent movement of the rim in one direction, spring actuated pawls also carried by said collar, the sleeve having ratchet teeth which the pawls engage to rotate the sleeve in one direction.

8. The combination of two gears arranged in suitable proximity, one gear being cone shaped and composed of independently operable sections for speed changing purposes, and the other gear being adjustable longitudinally of its shaft and the two gears being so arranged that during such adjustment the longitudinally movable gear will be successively brought into coöperative relation with the sections of the cone shaped gear, the teeth of the adjustable gear and the sections of the cone shaped gear having their extremities pointed to facilitate the shifting operation, certain of the sections of the cone shaped gear having a limited independent rotary movement in one direction for the purpose set forth.

9. Transmission mechanism including a cone-shaped gear composed of independently operable sections, a straight gear movable to successively mesh with said sections, a sleeve upon which the cone-shaped gear is mounted, one section of the gear being fast on the sleeve to move therewith in either direction, while the other sections are each composed of an outer rim and an inner collar having an interlocking connection with the rim to permit the latter a limited independent rotary movement in one direction, for the purpose set forth.

10. Transmission mechanism including a cone-shaped gear composed of independently operable sections, a gear movable to successively mesh with the said sections, a sleeve upon which the cone-shaped gear is mounted, the sections being each composed of an outer rim and an inner collar having an interlocking connection with the rim to permit a limited independent rotary movement in one direction, the collar being free to move in the opposite direction.

11. Transmission mechanism including a cone-shaped gear composed of independently operable sections, a driving gear movable to successively mesh with the said sections, a sleeve upon which the cone-shaped gear is mounted, the sections being each composed of an outer rim and an inner collar having an interlocking connection with the rim to permit an independent rotary movement in one direction.

In testimony whereof I affix my signature in presence of two witnesses.

GEORGE T. WILLIAMS.

Witnesses:
A. J. O'BRIEN,
ANNA L. LEHMAN.